(12) United States Patent
Oh

(10) Patent No.: US 9,094,592 B2
(45) Date of Patent: Jul. 28, 2015

(54) CAMERA MODULE WITH FOREIGN OBJECTS INHIBITING STRUCTURE

(71) Applicant: LG INNOTEK CO., LTD., Seoul (KR)

(72) Inventor: Young Taek Oh, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 246 days.

(21) Appl. No.: 13/676,860

(22) Filed: Nov. 14, 2012

(65) Prior Publication Data

US 2013/0120648 A1 May 16, 2013

(30) Foreign Application Priority Data

Nov. 15, 2011 (KR) .................. 10-2011-0118798
Nov. 23, 2011 (KR) .................. 10-2011-0123080

(51) Int. Cl.
*H04N 5/225* (2006.01)
(52) U.S. Cl.
CPC .......... *H04N 5/2252* (2013.01); *H04N 5/2257* (2013.01)
(58) Field of Classification Search
CPC .......... H04N 5/2252–5/2254; G03B 2217/002
USPC ........................... 348/340, 373, 374
See application file for complete search history.

(56) References Cited

U.S. PATENT DOCUMENTS

| 7,997,812 | B2* | 8/2011 | Kim ......................... 396/529 |
| 8,698,951 | B2* | 4/2014 | Kang et al. ................ 348/374 |
| 2007/0077050 | A1* | 4/2007 | Yu ........................... 396/133 |
| 2009/0015706 | A1* | 1/2009 | Singh ........................ 348/340 |
| 2010/0060776 | A1* | 3/2010 | Topliss et al. ............ 348/340 |
| 2010/0110270 | A1* | 5/2010 | Sekimoto et al. ......... 348/340 |
| 2010/0224216 | A1* | 9/2010 | Liao et al. ................. 134/8 |
| 2010/0284081 | A1* | 11/2010 | Gutierrez et al. ......... 359/554 |
| 2011/0063495 | A1* | 3/2011 | Tseng et al. .............. 348/357 |

* cited by examiner

*Primary Examiner* — Kelly L Jerabek
(74) *Attorney, Agent, or Firm* — Birch, Stewart, Kolasch & Birch, LLP

(57) ABSTRACT

A camera module is disclosed, the camera module including a lens barrel including more than one sheet of lens receiving an optical image of an object, an actuator moving the lens barrel, a PCB (Printed Circuit Board) formed with an image sensor at a bottom surface of the lens barrel for converting the optical image to an electrical signal, and a holder for supporting the lens barrel and the actuator and formed with a terminal electrically connected to the actuator, wherein an electrical contact point between the actuator and the terminal is formed with two or more tiers of coated layers.

6 Claims, 8 Drawing Sheets

CAMERA MODULE WITH FOREIGN OBJECTS INHIBITING STRUCTURE

CROSS-REFERENCE TO RELATED APPLICATION

The present application is based on, and claims priority from, Korean Application Number 10-2011-0118798 filed on Nov. 15, 2011, and Korean Application Number 10-2011-0123080 filed on Nov. 23, 2011 the disclosures of which are incorporated by reference herein in their entirety.

BACKGROUND OF THE PRESENT DISCLOSURE

1. Field of the Disclosure

The present disclosure relates to a camera module.

2. Description of Related Art

Generally, an optical device includes a lens transfer device moving a lens to an optical direction, where the lens transfer device uses an actuator such as an electromagnetic motor or a piezoelectric actuator as a means for generating a power. A cam or a screw is used as a means for transmitting power generated by the actuator.

Thus, the lens transfer device uses the power generated by the actuator to adjust a focus by moving the lens to an optical direction, whereby auto-focusing function is realized.

Meanwhile, a VCM (Voice Coil Motor) is a motor developed based on the principle that a diaphragm in a speaker is vibrated by a force generated between voice current flowing in the coil of a speaker and a magnetic force of a permanent magnet according to the Fleming's left-hand rule. The VCM performs a linear reciprocating motion on a lens at a short distance. The VCM may be used for precise tracking or focusing due to capacity of linearly reciprocating on a short distance compared with a rotation movement by a DC (Direct Current) motor or a stepping motor.

Recently, mobile terminals and PDAs (personal digital assistants) are largely and frequently mounted with a camera module. The camera module may be equipped with an AF (Auto Focusing) function, and a VCM is used for realizing the auto focusing function, where the VCM performs the auto focusing function by vertically moving a lens within a predetermined size of space. In order to perform the AF function in the conventional camera module, a lens position is changed to focus on a particular object.

That is, the camera module includes a VCM actuator for auto focusing, where the VCM actuator must generate an electromagnetic force on a coil for generating a force to drive a lens. To this end, the VCM actuator must be electrically connected to an outside terminal, where the electrical connection is performed by soldering at a contact point. However, there is a disadvantage in soldering due to fluxes or foreign objects falling into a camera module to contaminate an inside of the camera module.

Furthermore, an actuator and a lens barrel are embedded inside a case to be attached to a holder using an epoxy, where, when the case is attached to the holder, the epoxy is disadvantageously compressed to cause the epoxy to be squeezed out of the case and the holder, resulting in the camera module being defective.

SUMMARY

Accordingly, the present disclosure has been made keeping in mind the above disadvantages/problems occurring in the prior art, and it is an object of the present disclosure to provide a camera module configured to prevent the camera module from being polluted by foreign objects detached from a solder coated on a contact point between a coil of an actuator and a spring or a contact point between the spring and a terminal of a holder.

Furthermore, it is another object of the present disclosure to provide a camera module configured to prevent the camera module from being defected by an adhesive flowing outside of a case and a holder when the case is attached to the holder.

Technical problems to be solved by the present invention are not restricted to the above-mentioned statement, and any other technical problems not mentioned so far will be clearly appreciated from the following description by skilled in the art. That is, the present disclosure will be understood more easily and other objects, characteristics, details and advantages thereof will become more apparent in the course of the following explanatory description, which is given, without intending to imply any limitation of the disclosure, with reference to the attached drawings.

Technical Solution

The below Technical Solution section is intended to be merely exemplary and non-limiting.

In one general aspect of the present disclosure, there is provided a camera module, the camera module comprising: a lens barrel including more than one sheet of lens receiving an optical image of an object; an actuator moving the lens barrel; a PCB (Printed Circuit Board) formed with an image sensor at a bottom surface of the lens barrel for converting the optical image to an electrical signal; a holder formed with a terminal electrically connected to the actuator for supporting the lens barrel and the actuator; wherein an electrical contact point between the actuator and the terminal is formed with two or more tiers of coated layers.

Preferably, but not necessarily, a first tier of the coated layers may be formed with a conductive material including a solder for electrical connection between the actuator and the terminal.

Preferably, but not necessarily, the conductive material may be a solder.

Preferably, but not necessarily, a second tier wrapping the first tier of the coated layers may be formed with a coated layer for preventing foreign object generated from the first tier of coated layers from being separated.

Preferably, but not necessarily, a second tier of the coated layer may be an insulation material.

Preferably, but not necessarily, the second tier of the coated layer may be formed with a curable material cured by light or heat.

Preferably, but not necessarily, the camera module further comprises a yoke embedded with the lens barrel and the actuator, wherein the yoke may be fastened to a staircase sill of the holder.

Preferably, but not necessarily, the actuator may be any one of a VCM actuator, an actuator driven by a piezoelectric force and a MEMS (Micro Electro Mechanical System) actuator driven by an electrostatic capacity method.

Preferably, but not necessarily, the actuator may be a VCM actuator, and the VCM actuator may include a bobbin coupled to the lens barrel, a coil wound on a periphery of the bobbin, a magnet opposite to the coil, and a spring elastically supporting the bobbin.

Preferably, but not necessarily, the coil and the spring may be electrically connected, wherein a contact point between the terminal of the holder and the spring may be formed with two or more tiers of coated layers.

Preferably, but not necessarily, a contact point electrically connected by the coil and the spring may be further formed with two or more tiers of coated layer.

In another general aspect of the present disclosure, there is provided a camera module, the camera module comprising: a case embedded with a lens barrel including more than one sheet of lens receiving an optical image of an object and an actuator moving the lens barrel; a holder attached by the case using an adhesive for supporting the lens barrel and the actuator, wherein at least two or more lugs are formed at a holder contact surface attached by the case.

Preferably, but not necessarily, a void space may be formed between the lugs, wherein an adhesive may be filled in the void space to attach the case and the holder.

Preferably, but not necessarily, no adhesive may be interposed between the lug and the case.

Preferably, but not necessarily, an adhesive may be interposed between the lug and the case.

Preferably, but not necessarily, the case may be fastened to the staircase sill of the holder.

Preferably, but not necessarily, a floor surface of the staircase sill may be a sloped surface.

Preferably, but not necessarily, a gap between the holder and the case to the staircase lateral wall of the holder may be greater than a gap between the holder and the case to a peripheral direction of the holder and the case.

Preferably, but not necessarily, a floor surface of the staircase sill of the holder may be a staircase surface.

Preferably, but not necessarily, the floor surface of the staircase sill is formed with a staircase surface, and the staircase surface may be so formed as to make an area of the floor surface of the staircase sill to a direction of lateral wall of the staircase sill of the holder lower than an area of the floor surface of the staircase sill to a peripheral direction of a holder and the case.

Preferably, but not necessarily, the floor surface of the staircase sill may be formed at the case.

Preferably, but not necessarily, width of an area of the floor surface of the staircase sill to the direction of the lateral wall of the staircase sill of the holder may be greater than width of the floor surface of the staircase sill to the peripheral direction of a holder and the case.

Preferably, but not necessarily, the actuator may be any one of a VCM actuator, an actuator driven by piezoelectricity, and a MEMS actuator driven by an electrostatic capacity method.

Preferably, but not necessarily, the adhesive may be an epoxy.

Preferably, but not necessarily, the case may be a yoke unit of the actuator.

The camera module according to exemplary embodiments of the present disclosure has an advantageous effect in that a conductive first coated layer coated on a contact point between a coil of an actuator and a spring, or a contact point between the spring and a holder is wrapped by a second coated layer to prevent a foreign object generated from the first coated layer from being separated, whereby the camera module can be prevented from being polluted.

Another advantageous effect is that a lug is formed at a surface of a holder contacting a case to create a space to be filled with an adhesive, whereby even if the case is pressed to the holder for attaching the case to the holder, the adhesive is prevented from being compressed to prevent the adhesive from spilling to a periphery of the case and the holder, thereby avoiding causing failure of the camera module.

BRIEF DESCRIPTION OF DRAWINGS

The accompanying drawings, which are included to provide a further understanding of the disclosure, and which are incorporated in and constitute a part of this application, illustrate embodiments of the disclosure and together with the description serve to explain the principle of the disclosure. In the drawings.

DETAILED DESCRIPTION

Figure 1:
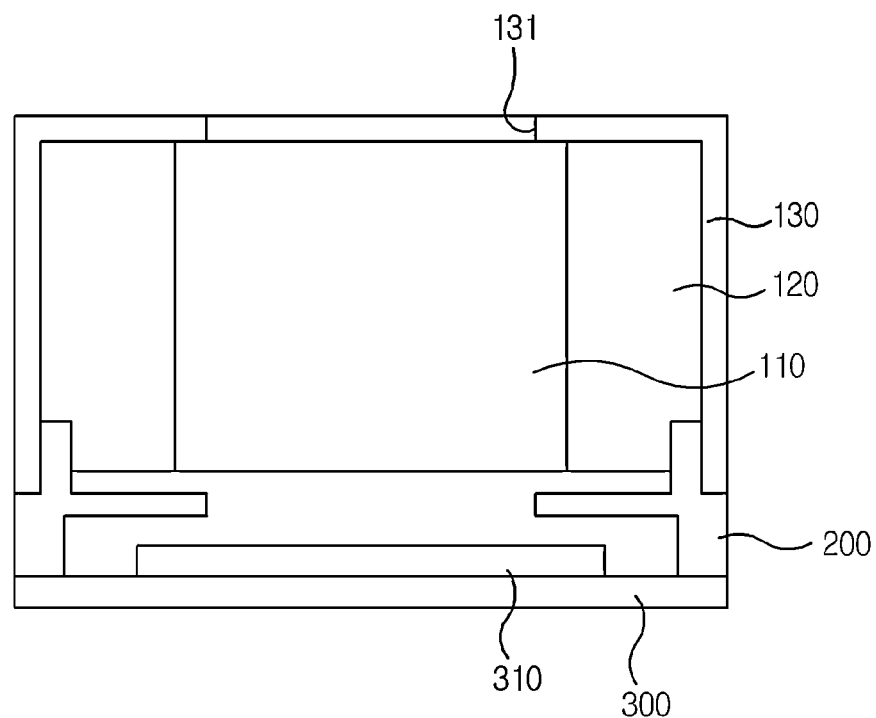
FIG. 1 is a mimetic view illustrating a configuration of a camera module according to an exemplary embodiment of the present disclosure.

Hereinafter, exemplary embodiments of the present disclosure will be described in detail with reference to the accompanying drawings. In the drawings, sizes or shapes of constituent elements may be exaggerated for clarity and convenience.

In describing the present disclosure, detailed descriptions of constructions or processes known in the art may be omitted to avoid obscuring appreciation of the invention by a person of ordinary skill in the art with unnecessary detail regarding such known constructions and functions.

Accordingly, particular terms may be defined to describe the disclosure in the best mode as known by the inventors. Accordingly, the meaning of specific terms or words used in the specification and the claims should not be limited to the literal or commonly employed sense, but should be construed in accordance with the spirit and scope of the disclosure. The definitions of these terms therefore may be determined based on the contents throughout the specification.

Now, construction and operation of the camera module according to the exemplary embodiments of the present disclosure will be described in detail with reference to the accompanying drawings.

FIG. 1 is a mimetic view illustrating a configuration of a camera module according to an exemplary embodiment of the present disclosure.

Referring to FIG. 1, a camera module according to an exemplary embodiment of the present disclosure includes a lens barrel (110) including one or more sheets of lenses receiving an optical image of an object, an actuator (120) moving the lens barrel (110), a PCB (Printed Circuit Board, 300) formed with an image sensor (310) at a bottom surface of the lens barrel for converting the optical image to an electrical signal, and a holder (200) for supporting the lens barrel and the actuator and formed with a terminal electrically connected to the actuator (120), wherein an electrical contact point between the actuator (120) and the terminal is formed with two or more tiers of coated layers (not shown).

At this time, a first tier of the coated layers wrapping the contact point is formed with a conductive material for electrical connection between the actuator (120) and the terminal, and a second tier wrapping the first tier of the coated layers is formed with a coated layer for preventing a foreign object generated from the first tier of coated layers from being separated. The second tier of the coated layer is formed with an insulation material that may be used as a means for interrupting an electromagnetic field generated from the camera module and influences from the electromagnetic field.

Thus, the camera module according to an exemplary embodiment of the present disclosure, as will be described later, has an advantage in that separation of foreign object generated from a coated layer at a contact point can be interrupted by a two-tier of the coated layer to prevent the camera module from being polluted, thereby enhancing reliability of the camera module.

At this time, in case of the coated layer of a first tier being a solder, flux may be separated, and the separation of the flux is interrupted by a second tier of coated layer. Furthermore, the camera module may further include a yoke (130) embedded with the lens barrel (110) and the actuator (120). The yoke (130) wraps the lens barrel (110) and the actuator (120) and is fastened to a staircase sill of the holder (200) to thereby promote the convenience of assembly.

As described, FIG. 1 is a mimetic view illustrating a configuration of a camera module according to an exemplary embodiment of the present disclosure, where an organic coupling of the lens barrel (110), the actuator (120), the yoke (130), the holder (200), the PCB (300) and the image sensor (310) may be freely changed design-wise, and contact or disconnection thereamong may be foreseeable.

The actuator (120) moves along an optical axis of the lens barrel for auto focusing. The actuator (120) may include any one of a VCM actuator, an actuator driven by a piezoelectric force and a MEMS (Micro Electro Mechanical System) actuator driven by an electrostatic capacity method. The VCM actuator may include a bobbin, a coil, a magnet, and a yoke. In addition, the camera module according to an exemplary embodiment of the present disclosure may include a shake compensation actuator capable of compensating shake of an optical image of an object, although the shake compensation actuator is not illustrated in FIG. 1.

The shake compensation actuator may be so configured as to move a separate lens optically arranged with a lens embedded in the lens barrel to two axes of x axis and y axis and to compensate the shake of the optical image. At this time, the holder (200) may further include a terminal electrically connected to the shake compensation actuator. An electrical contact point between holder (200) and the shake compensation actuator may be formed with a coated layer of two or more tiers. For reference, reference numeral '131' in FIG. 1 is a window formed on the yoke (130) through which an optical image of an object passes and is incident on a lens.

Figure 2:
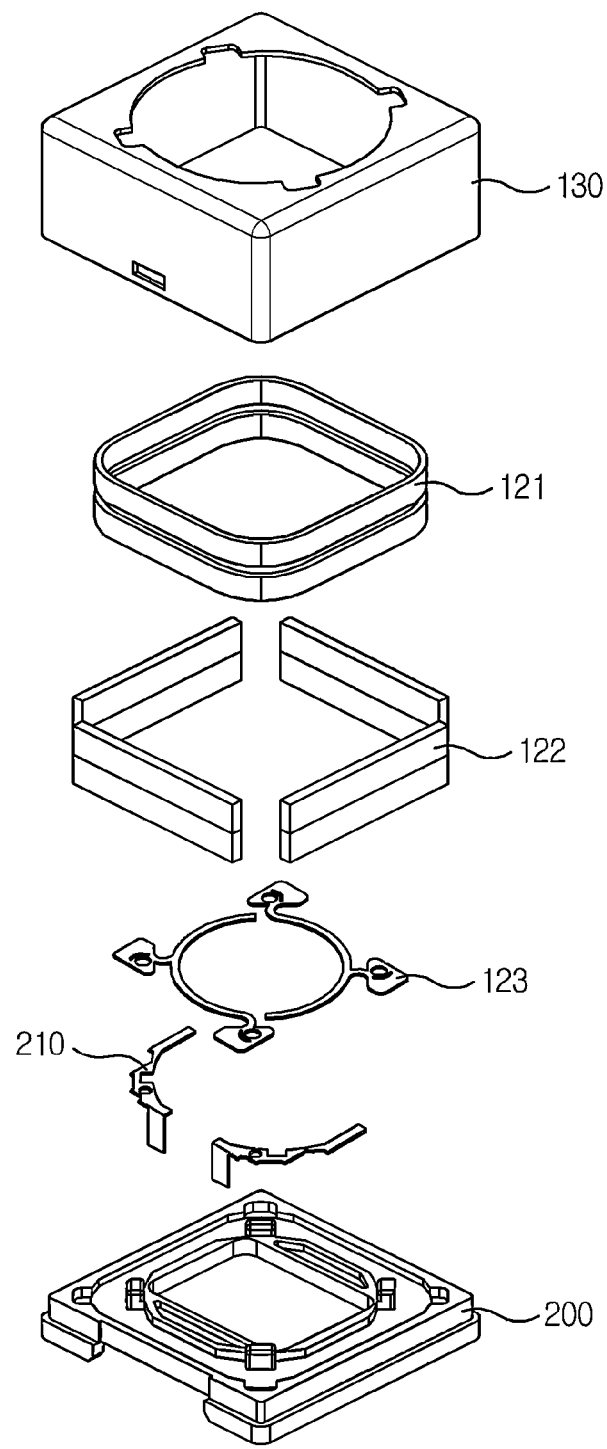
FIG. 2 is a perspective view illustrating an actuator of a camera module according to an exemplary embodiment of the present disclosure.

FIG. 2 is a perspective view illustrating an actuator of a camera module according to an exemplary embodiment of the present disclosure. As explained before, the actuator of a camera module according to an exemplary embodiment of the present disclosure may be a VCM actuator including a coil (121) and a magnet (122) for moving the lens barrel along an optical axis.

At this time, the VCM actuator includes a bobbin coupled to the lens barrel, a coil (121) wound on edge of the bobbin, a magnet (122) opposite to the coil (121) and a spring (123) elastically supporting the bobbin. The coil (121) is applied with a current through the spring (123), where the coil (121) and the spring (123) are electrically connected. Thus, a contact point between the coil (121) and the spring (123) may be formed with a coated layer (not shown) with two or more tiers. The VCM actuator may further include the yoke (130) including the bobbin, the coil (121), the magnet (122) and the spring (123).

The yoke (130) is coupled to the holder (200), the holder (200) is formed with a terminal (210) electrically connected to the spring (123), and an electrical contact point between the spring (123) and the terminal (210) of the holder (200) is formed with a coated layer of two or more tiers. The spring (123) is preferably a leaf spring. For reference, the terminal (210) electrically connected to the spring (123) is mounted at the holder (200).

Figure 3:
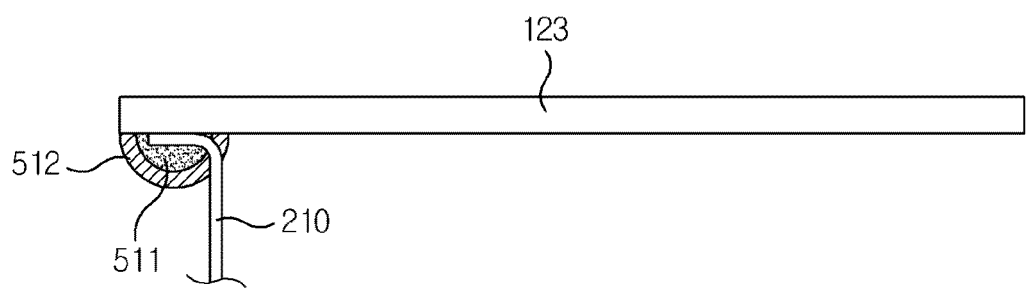
FIG. 3 is a partial cross-sectional view illustrating a contact point of a terminal at a spring and a holder of a camera module according to an exemplary embodiment of the present disclosure.
Figure 4:
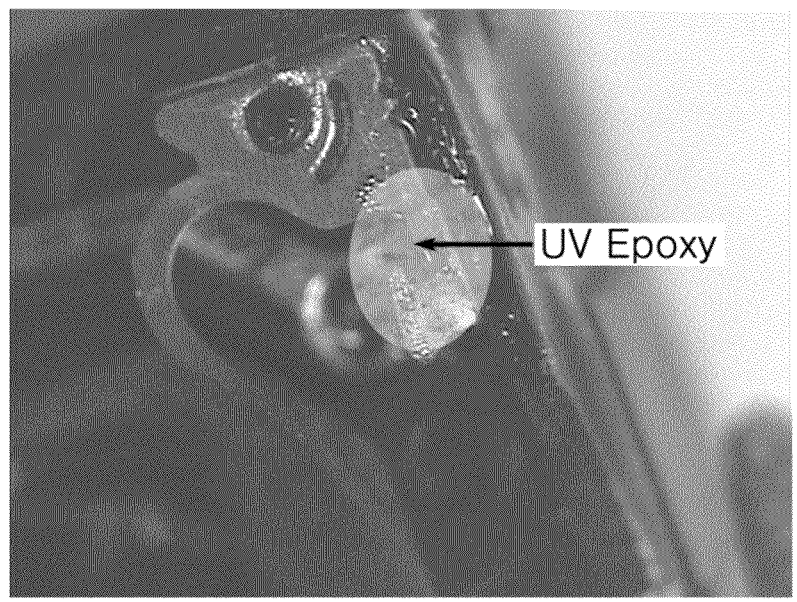
FIG. 4 is a photographic view illustrating a state of an UV epoxy coated on the contact point of FIG. 3.
Figure 5:
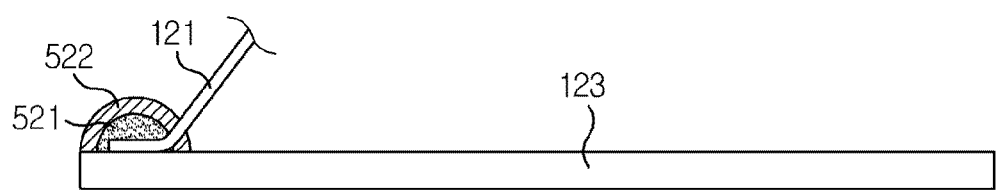
FIG. 5 is a partial cross-sectional view illustrating a contact point of a terminal at a spring and a coil of a camera module according to an exemplary embodiment of the present disclosure.
Figure 6:
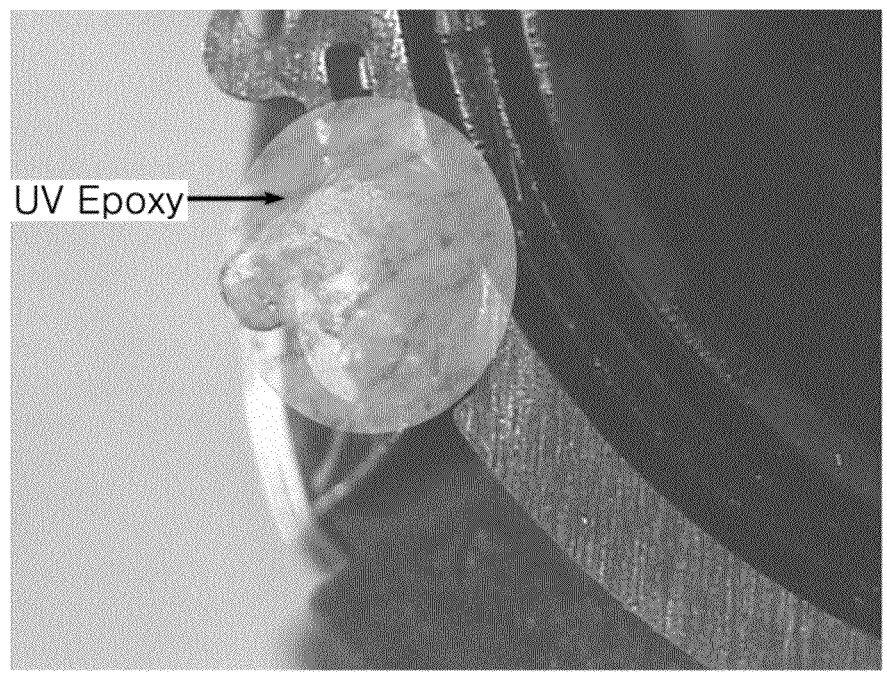
FIG. 6 is a photographic view illustrating a state of an UV epoxy coated on the contact point of FIG. 3.

FIG. 3 is a partial cross-sectional view illustrating a contact point of a terminal at a spring and a holder of a camera module according to an exemplary embodiment of the present disclosure, FIG. 4 is a photographic view illustrating a state of an UV epoxy coated on the contact point of FIG. 3, FIG. 5 is a partial cross-sectional view illustrating a contact point of a terminal at a spring and a coil of a camera module according to an exemplary embodiment of the present disclosure, and FIG. 6 is a photographic view illustrating a state of an UV epoxy coated on the contact point of FIG. 3.

Referring to FIG. 3, a contact point between the spring (123) of the camera module according to an exemplary embodiment of the present disclosure and the terminal (210) of the holder (200) is wrapped with a first coated layer (511), and a second coated layer (512) is wrapped on the first coated layer (511).

Referring to FIG. 5, a contact point between the spring (123) of the camera module according to an exemplary embodiment of the present disclosure and the coil (121) is wrapped with a first coated layer (521), and a second coated layer (522) is wrapped on the first coated layer (521). The first coated layers (511, 521) may be applied with a solder as a conductive material, and the second coated layers (512, 522) may be applied with a curable material that is cured by light or heat.

For a non-limiting example, a second coated layer of UV epoxy is coated on the contact point between the spring (123) and the terminal (210) of the holder as shown in FIG. 4, and a second coated layer of UV epoxy is coated on the contact point between the spring (123) and the coil (121) as shown in FIG. 6.

Thus, the camera module according to an exemplary embodiment of the present disclosure has an advantage in that a contact point between a coil of an actuator and a spring, and a contact point between a spring and a terminal of a holder is wrapped by a second coated layer wrapped by a conductive first coated layer, such that a foreign object generated from the first coated layer can be prevented from separating from the second coated layer to prevent the camera module from being polluted.

Figure 7:
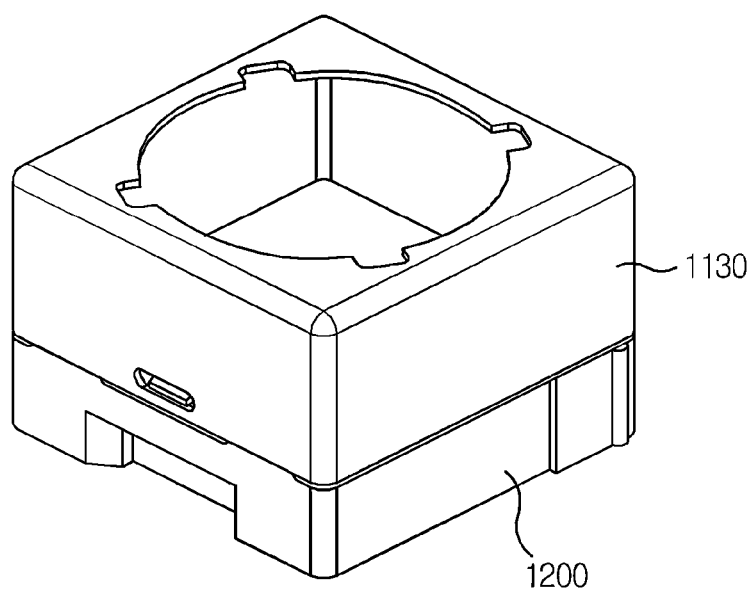
FIG. 7 is a partial perspective view illustrating a camera module according to an exemplary embodiment of the present disclosure.

FIG. 7 is a partial perspective view illustrating a camera module according to an exemplary embodiment of the present disclosure.

Referring to FIG. 7, the camera module according to an exemplary embodiment of the present disclosure includes a case (1130) embedded with a lens barrel (not shown) including more than one sheet of lens receiving an optical image of an object and an actuator (not shown) moving the lens barrel; a holder (1200) attached by the case (1130) using an adhesive (not shown) for supporting the lens barrel and the actuator, wherein at least two or more lugs (not shown) are formed at a contact surface of the holder (1200) attached by the case (1130).

At this time, the lug is brought into contact with the case (1130), and an empty space is formed where the lug is not formed between the holder (1200) and the case (1130). That is, the empty space is formed between the lugs. Thus, an adhesive can be filled in between the lugs for attaching the case (1130) and the holder (1200), whereby the adhesive is prevented from escaping from between the case (1130) and the holder (1200) and flowing out to a surface between the case (1130) and the holder (1200).

Furthermore, the case (1130) may be a yoke unit of the actuator and a lug unit may be formed on the yoke unit. The adhesive may be interposed between the case (1130), the lugs and the space to allow the case (1130) and the holder (1200) to be adhered, or the adhesive may not be interposed between the case (1130) and the lugs but the adhesive may be filled only in the space to allow the case (1130) and the holder (1200) to be adhered. The adhesive may be an epoxy.

At this time, in case of the lugs not being formed, if the holder (1200) is coated with the adhesive, and the case (1130) is pressed to the holder (1200) to attach the case (1130) to the holder (1200), the epoxy is compressed to be oozed out to an outside of the case (1130) and the holder (1200).

Thus, in the present disclosure, because lugs are formed on a surface of the holder (1200) attached to the case (1130) to form a space for an adhesive, the adhesive is not compressed even though the case (1130) is pressed to the holder (1200) to attach the case (1130) to the holder (1200), whereby defects on the camera module caused by the oozed-out adhesive to the outside of the case (1130) and the holder (1200) can be prevented.

Meanwhile, the actuator moves the lens barrel along an optical axis for auto focusing, where the actuator may be one of a VCM actuator, an actuator driven by a piezoelectric force and a MEMS (Micro Electro Mechanical System) actuator driven by an electrostatic capacity method. The VCM actuator may include a bobbin, a coil, a magnet, and a case. The case may include a yoke thereinside.

Figure 8:
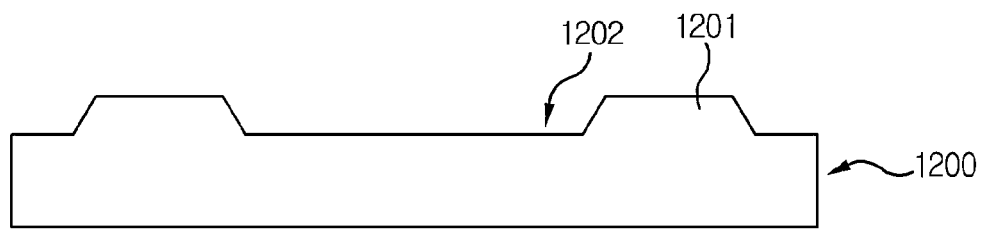
FIG. 8 is a mimetic cross-sectional view illustrating a lug formed at a holder of a camera module according to an exemplary embodiment of the present disclosure.
Figure 9:
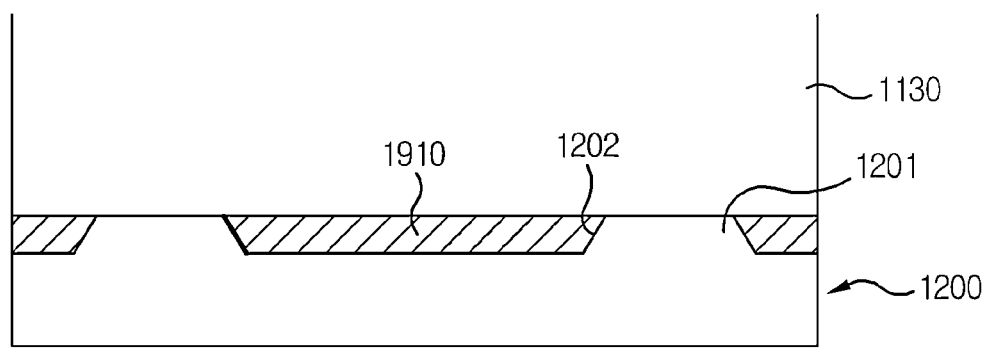
FIG. 9 is a partial mimetic cross-sectional view illustrating a state of a case being attached to a holder of a camera module according to an exemplary embodiment of the present disclosure.

FIG. 8 is a mimetic cross-sectional view illustrating a lug formed at a holder of a camera module according to an exemplary embodiment of the present disclosure, and FIG. 9 is a partial mimetic cross-sectional view illustrating a state of a case being attached to a holder of a camera module according to an exemplary embodiment of the present disclosure.

Referring to FIG. 8, at least two or more lugs (1201) are formed on a surface of the holder (1200) adhered by the case, and a space (1202) is formed between the lugs (1202).

Referring to FIG. 3 again, in a case the case (1130) is attached to the holder (1200), the space (1202) is filled in by an adhesive (910), such that even if the case (1130) provides a pressure-applying force to the holder (1200), the adhesive (910) is prevented from flowing out of the outside of the case (1130) and the holder (1200).

Figure 10:
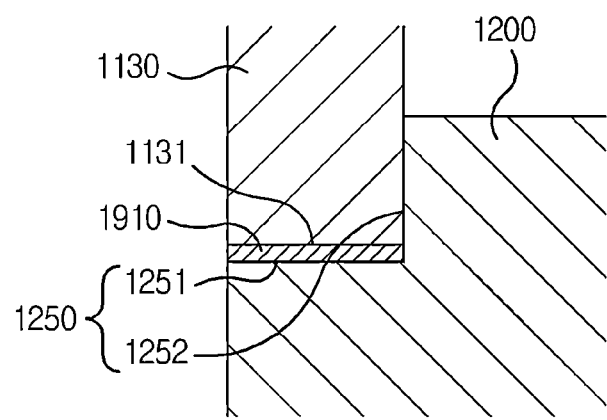
FIG. 10 is a partial cross-sectional view illustrating a state of a case being attached to a holder of a camera module according to a first exemplary embodiment of the present disclosure.
Figure 11:
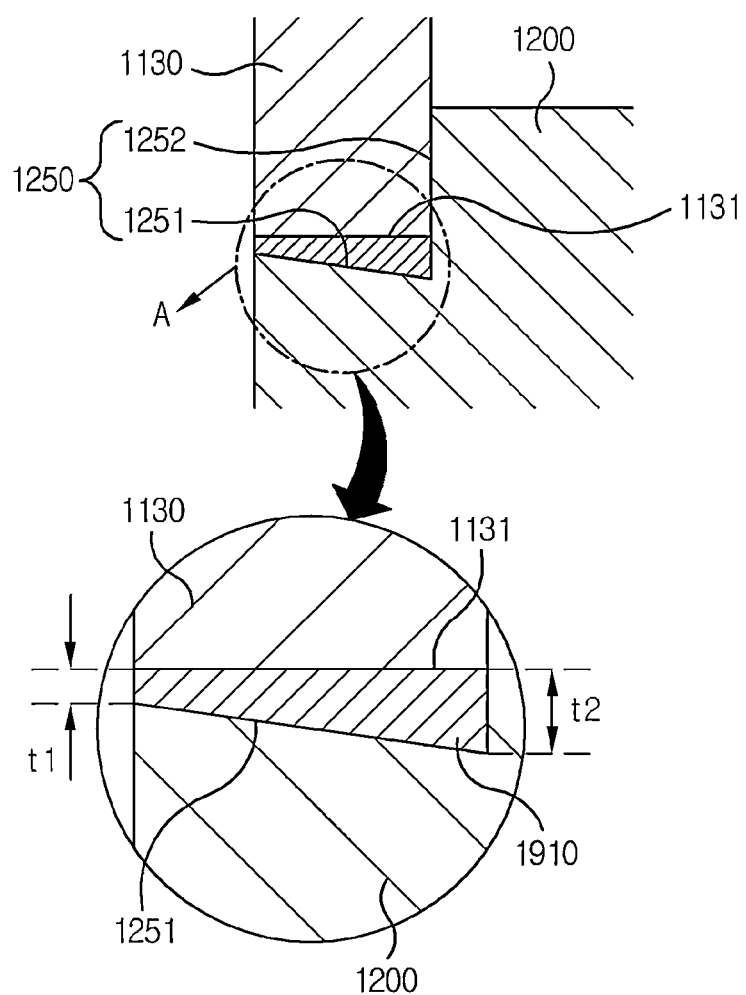
FIG. 11 is a partial cross-sectional view illustrating a state of a case being attached to a holder of a camera module according to a second exemplary embodiment of the present disclosure.

FIG. 10 is a partial cross-sectional view illustrating a state of a case being attached to a holder of a camera module according to a first exemplary embodiment of the present disclosure, and FIG. 11 is a partial cross-sectional view illustrating a state of a case being attached to a holder of a camera module according to a second exemplary embodiment of the present disclosure.

The state of the case being attached to the holder of the camera module according to the first exemplary embodiment of the present disclosure is such that, as illustrated in FIG. 4, the case (1130) is fastened to a staircase sill (1250) of the holder (1200) for promoted convenience of assembly. The staircase sill (1250) includes a staircase floor surface (1251) and a staircase lateral wall (1252).

At this time, an adhesive (1910) is coated on the staircase sill floor surface (1251) of the holder (1200) to allow a distal end (1131) of the case (1130) to be attached, and the staircase sill lateral wall (1252) of the holder (1200) is adhered by the case (1130) to allow the case (1130) and the holder (1200) to be tightly coupled.

The state of the case being attached to the holder of the camera module according to the second exemplary embodiment of the present disclosure is such that the staircase sill floor surface (1251) of the holder (1200) is sloped. That is, as shown in FIG. 11, the adhesive (910) is interposed between the holder (1200) and the case (1130), and the adhesive (910) is filled in on the staircase floor surface (1251).

At this time, the slope of the staircase sill floor surface (1251) of the holder (1200) is such that a gap between the case (1130) and the holder (1200) is so designed as to grow larger to a direction of the staircase sill lateral wall (1252) of the holder (1200), whereby leakage of the adhesive (1910) can be further prevented to a peripheral direction (A) of the case (1130) and the holder (1200).

At this time, a gap (t2) between the holder (1200) and the case (1130) to the staircase sill lateral wall (1252) of the holder (1200) may be greater than a gap (t1) between the holder (1200) and the case (1130) to the peripheral direction (A) of the holder (1200) and the case (1130).

Figure 12:
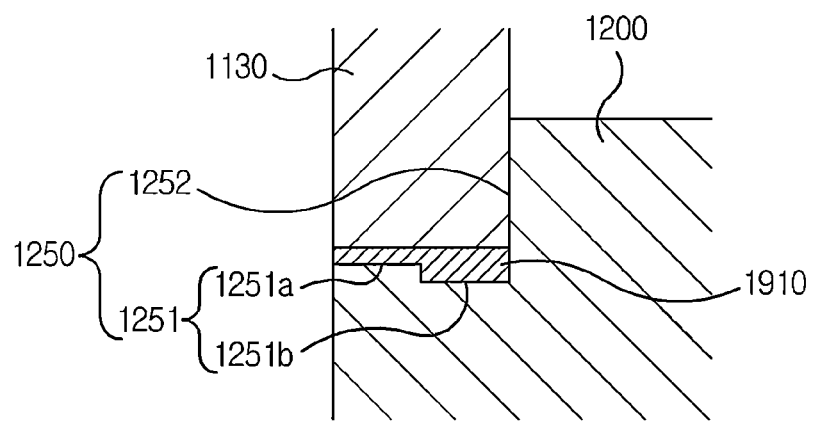
FIG. 12 is a partial cross-sectional view illustrating a state of a case being attached to a holder of a camera module according to a third exemplary embodiment of the present disclosure.
Figure 13:
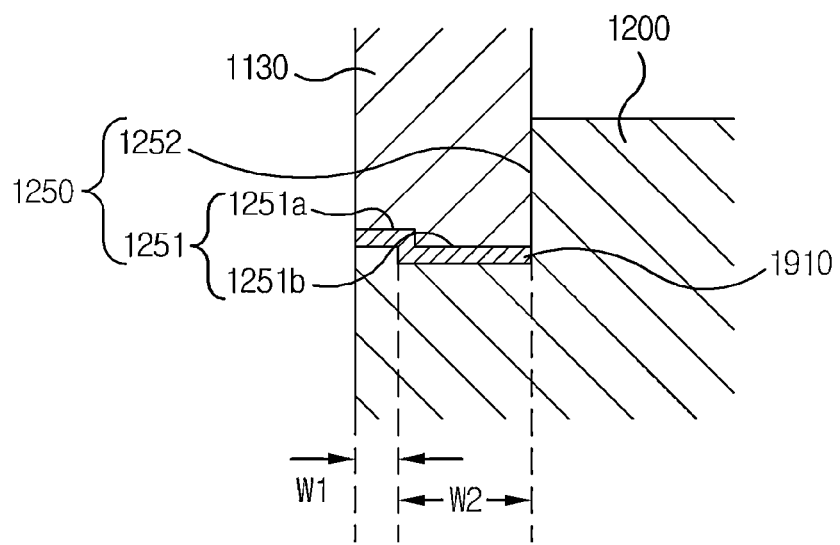
FIG. 13 is a partial cross-sectional view illustrating a state of a case being attached to a holder of a camera module according to a fourth exemplary embodiment of the present disclosure.

FIG. 12 is a partial cross-sectional view illustrating a state of a case being attached to a holder of a camera module according to a third exemplary embodiment of the present disclosure, and FIG. 13 is a partial cross-sectional view illustrating a state of a case being attached to a holder of a camera module according to a fourth exemplary embodiment of the present disclosure.

The state of the case being attached to the holder of the camera module according to the third exemplary embodiment of the present disclosure is such that a floor surface of the staircase sill is formed with a staircase sill surface.

At this time, as illustrated in FIG. 12, the staircase sill surface may be formed by making an area (1251b) of the floor surface of the staircase sill, in the staircase sill floor surface (1251) of the holder (1200), to a direction of the staircase sill lateral wall (1252) of the holder (1200) lower than an area (1251a) of the floor surface of the staircase sill to the peripheral direction of the holder (1200) and the case (1130).

That is, a relatively lower floor surface area (1251b) to the direction of the staircase sill lateral wall (1252) of the holder (1200) can be filled with more adhesive, whereby leakage of the adhesive (1910) to the peripheral direction of the holder (1200) and the case (1130) can be difficult.

Furthermore, as illustrated in FIG. 13, a staircase sill surface (not shown) press-fitted to the staircase surface can be formed in the case (1130), in a case the staircase sill floor surface (1251) of the holder (1200) is formed with the staircase. At this time, a width (w2) of an area of floor surface area (1251b) to the direction of the staircase sill lateral wall (1252) of the holder (1200) is greater than a width (w1) of the floor surface of the staircase sill to the peripheral direction of a holder and the case.

The above-mentioned camera module according to exemplary embodiments of the present disclosure and attached drawings may, however, be embodied in many different forms and should not be construed as limited to the embodiment set forth herein. Thus, it is intended that embodiment of the present disclosure may cover the modifications and variations of this disclosure provided they come within the scope of the appended claims and their equivalents.

What is claimed is:

1. A camera module, comprising:
   a case;
   a lens barrel disposed within the case and including more than one sheet of lens receiving an optical image of an object;
   an actuator moving the lens barrel;
   a PCB (Printed Circuit Board) arranged with an image sensor below the lens barrel for converting an optical image to an electrical signal; and
   a holder coupled to the case and including a terminal electrically connected to the actuator,
   wherein an electrical contact point between the actuator and the terminal is formed with two or more tiers of coated layers,
   wherein a first tier of the coated layers is formed with a conductive material including a solder for electrical connection between the actuator and the terminal, and
   wherein a second tier wrapping the first tier of the coated layers is an insulation material for preventing foreign objects generated from the first tier of coated layers from being separated, and is formed with a coated layer curable by any one of light and heat.

2. The camera module of claim 1, wherein the case includes a yoke embedded with the lens barrel and the actuator, and
   wherein the yoke is fastened to a staircase sill of the holder.

3. The camera module of claim 1, wherein the actuator is any one of a VCM actuator, an actuator driven by a piezoelectric force and a MEMS (Micro Electro Mechanical System) actuator driven by an electrostatic capacity method.

4. The camera module of claim 1, wherein the actuator is a VCM actuator, and the VCM actuator includes a bobbin coupled to the lens barrel, a coil wound on a periphery of the bobbin, a magnet opposite to the coil, and a spring elastically supporting the bobbin.

5. A camera module, comprising:
   a case
   a lens barrel disposed within the case and including more than one sheet of lens receiving an optical image of an object;
   an actuator moving the lens barrel;
   a PCB (Printed Circuit Board) arranged with an image sensor below the lens barrel for converting an optical image to an electrical signal; and
   a holder coupled to the case and including a terminal electrically connected to the actuator,
   wherein an electrical contact point between the actuator and the terminal is formed with two or more tiers of coated layers,
   wherein the actuator is a VCM actuator, and the VCM actuator includes a bobbin coupled to the lens barrel, a coil wound on a periphery of the bobbin, a magnet opposite to the coil, and a spring elastically supporting the bobbin, and
   wherein the coil and the spring are electrically connected, and a contact point between the terminal of the holder and the spring is formed with two or more tiers of coated layers.

6. A camera module, comprising:
   a case
   a lens barrel disposed within the case and including more than one sheet of lens receiving an optical image of an object;
   an actuator moving the lens barrel;
   a PCB (Printed Circuit Board) arranged with an image sensor below the lens barrel for converting an optical image to an electrical signal; and
   a holder coupled to the case and including a terminal electrically connected to the actuator,
   wherein an electrical contact point between the actuator and the terminal is formed with two or more tiers of coated layers,
   wherein the actuator is a VCM actuator, and the VCM actuator includes a bobbin coupled to the lens barrel, a coil wound on a periphery of the bobbin, a magnet opposite to the coil, and a spring elastically supporting the bobbin, and
   wherein a contact point electrically connected by the coil and the spring is further formed with two or more tiers of coated layers.

* * * * *